US008081738B2

(12) United States Patent
Takeda et al.

(10) Patent No.: US 8,081,738 B2
(45) Date of Patent: Dec. 20, 2011

(54) VISUAL COMMUNICATION SYSTEM AND ITS MAIN APPARATUS

(75) Inventors: Nobuyuki Takeda, Hachioji (JP); Yasumasa Sasaki, Tachikawa (JP); Koji Shima, Sagamihara (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 939 days.

(21) Appl. No.: 12/048,048

(22) Filed: Mar. 13, 2008

(65) Prior Publication Data

US 2008/0260111 A1    Oct. 23, 2008

(30) Foreign Application Priority Data

Apr. 18, 2007    (JP) .................................. 2007-109536

(51) Int. Cl.
*H04M 11/04* (2006.01)
(52) U.S. Cl. ..................................... 379/45; 348/211.12
(58) Field of Classification Search .................... 379/45, 379/93.17; 348/207.99, 207.1, 211.11, 211.12, 348/211.13
See application file for complete search history.

(56) References Cited

U.S. PATENT DOCUMENTS

| 7,424,282 | B2 * | 9/2008 | Barbeau | ..................... 455/404.1 |
| 2004/0057560 | A1 * | 3/2004 | Nakamura | ................. 379/88.13 |
| 2006/0029051 | A1 * | 2/2006 | Harris et al. | ................. 370/356 |
| 2006/0050685 | A1 * | 3/2006 | Sung et al. | ..................... 370/352 |
| 2007/0255115 | A1 * | 11/2007 | Anglin et al. | ................. 600/300 |
| 2008/0260111 | A1 * | 10/2008 | Takeda et al. | ................... 379/45 |

FOREIGN PATENT DOCUMENTS

| JP | 03-143066 | 6/1991 |
| JP | 07-093684 | 4/1995 |
| JP | 2002-152390 | 5/2002 |
| JP | 2003-110586 | 4/2003 |
| JP | 2005-295223 | 10/2005 |
| JP | 2006-074772 | 3/2006 |
| JP | 2007-036977 | 2/2007 |

OTHER PUBLICATIONS

Japanese Office Action dated Aug. 23, 2011.

* cited by examiner

*Primary Examiner* — Olisa Anwah
(74) *Attorney, Agent, or Firm* — Pillsbury Winthrop Shaw Pittman, LLP

(57) ABSTRACT

According to one embodiment, an apparatus accommodates a telephone terminal and an emergency call terminal, wherein the telephone terminal is associated with the first video camera and a first display, the emergency call terminal is associated with a second video camera and a second display, and the apparatus further includes a determination processor determines whether or not a call generated from the telephone terminal is an emergency call, a visual link former forms an image communication link between the first video camera and the second display to display an image captured by the first video camera on the second display if the determination processor determines the call is the emergency call, and a voice link former forms a voice communication link between the telephone terminal and the emergency call terminal when the emergency call terminal performs a response to the call after the image communication link is formed.

12 Claims, 2 Drawing Sheets

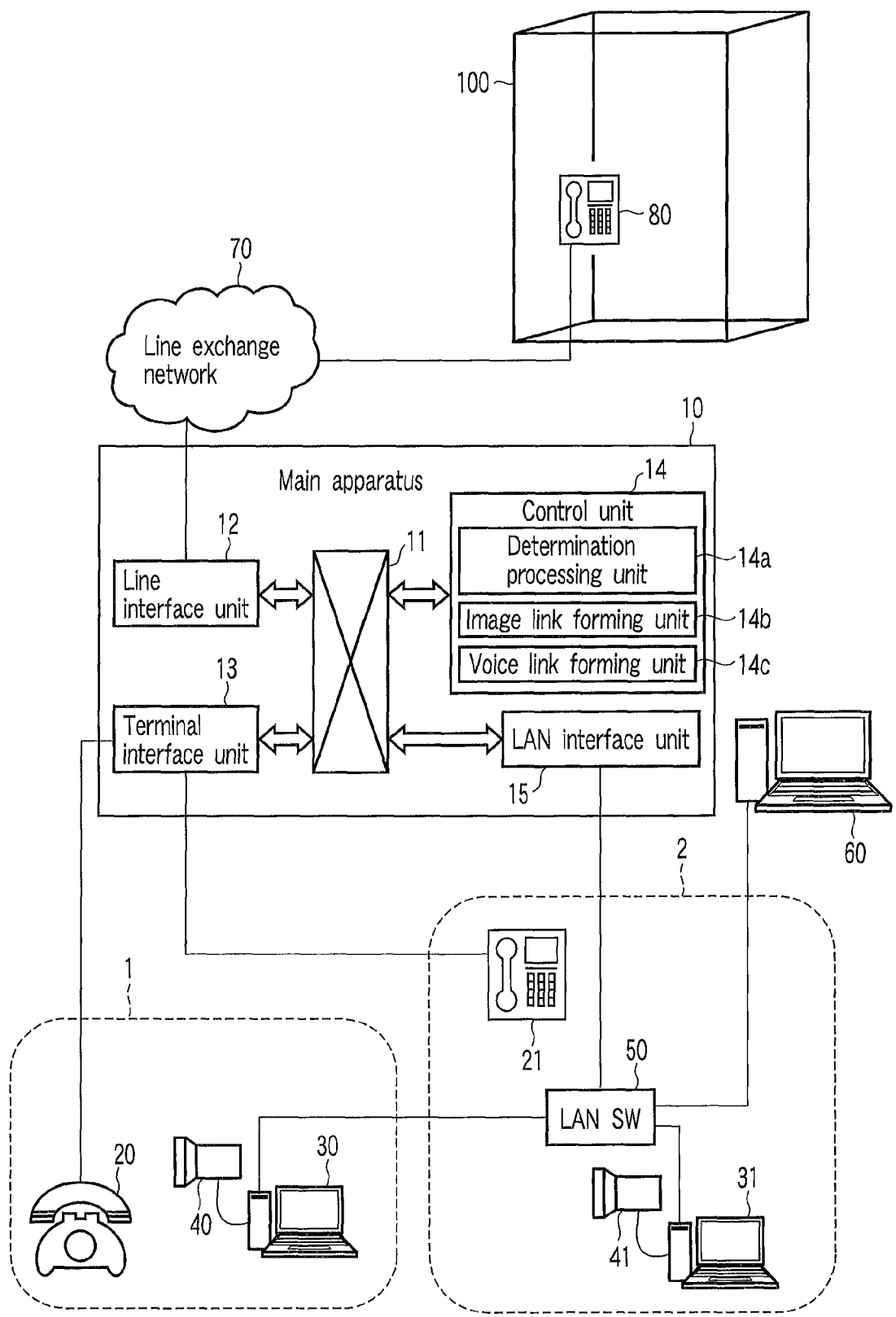
F I G. 1

VISUAL COMMUNICATION SYSTEM AND ITS MAIN APPARATUS

CROSS-REFERENCE TO RELATED APPLICATIONS

This application is based upon and claims the benefit of priority from Japanese Patent Application No. 2007-109536, filed Apr. 18, 2007, the entire contents of which are incorporated herein by reference.

BACKGROUND

1. Field

One embodiment of the present invention relates to a visual communication system equipped with an emergency call function and a main apparatus for the system.

2. Description of the Related Art

In recent years, a telephone system, so-called a Voice over IP (VoIP), not only in a form using a line exchange network but also in a form has become used widely. Recently, a telephone system which may communicate not only voice but also images, including still images and moving images, has become widely used. Such a kind of system is also referred to as a visual communication system.

The telephone system has an emergency call function. This function includes the Japanese emergency police telephone number 110, the Japanese emergency fire station telephone number 119, the U.S.A. emergency telephone number 911, etc. That is, the function immediately connects a telephone call to a specialty organization or a management center by making a call through a special telephone number. There is a need for a manager to be stationed at a connection destination, and it is needed for the manager who has responded through the called terminal (emergency call terminal) to immediately know the situation of the caller.

In the existing telephone system, the manager may only monitor the situation in which the caller is located. However, since an accurate situation is hard to be known only through voice, any improvement has been desired. If the response itself from the manager has not been made, nothing can be done for the situation. Especially, immediate measures against the following environment have been desired.

For instance, it is assumed that a hospital patient who is in bad physical condition and loses consciousness in the middle of intending to make a nurse call. In such a case, since the manager cannot grasp the situation of the patient at all, although emergency measures are required, appropriate correspondence may not be done. A function of regarding an emergency call if the caller side telephone set being in a off-hooked state and ringing the alarm whistle from the emergency call terminal has been known; however in the foregoing case, since the patient loses consciousness, the manager may not grasp the situation only from its voice.

A related technique is disclosed in Jpn. Pat. Appln. KOKAI Publication No. 2006-74772. This patent document discloses a technique which photographs an image of a caller to transfer the image to an incoming call side terminal and displays the image on the incoming call side terminal when a ringing signal is generated in coupling a call between the incoming call side terminal and an outgoing call side terminal. However, even such a technique does not always effectively correspond in an emergency. Because the caller may be located in a situation in which the caller cannot generate even the ringing signal.

As mentioned above, as regards the above mentioned existing telephone system, there is still room for improvement in an emergency call function, and some measures are required.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is a system view depicting an exemplary example of an embodiment of a visual communication system regarding the invention.

DETAILED DESCRIPTION

Figure 2:
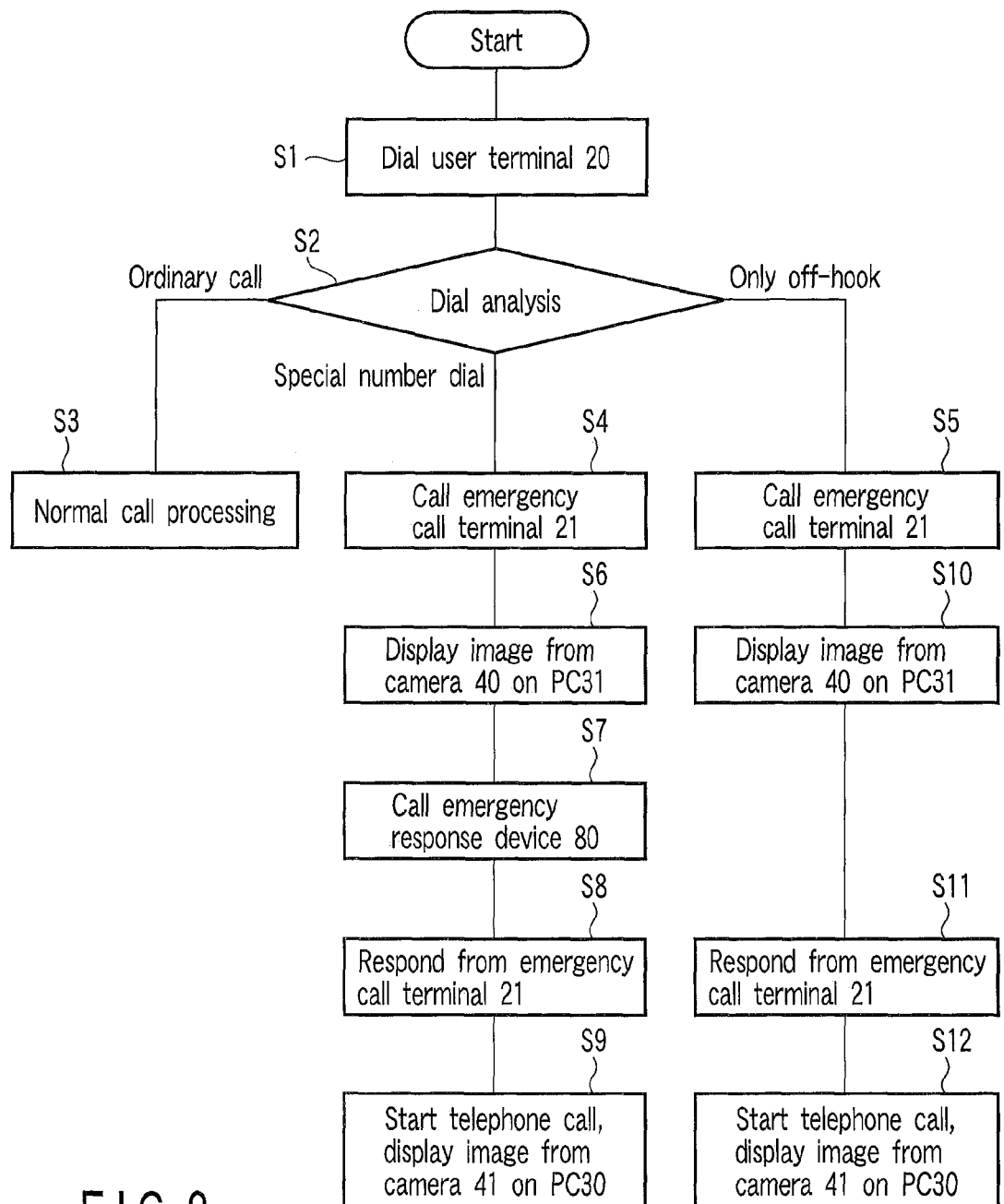
FIG. 2 is a flowchart depicting an exemplary example of a processing procedure in the system of FIG. 1.

Various embodiments according to the invention will be described hereinafter with reference to the accompanying drawings. In general, according to one embodiment of the invention, a visual communication system comprising: a telephone terminal; a first video camera to be associated with the telephone terminal; a first display unit to be associated with the telephone terminal; an emergency call terminal that is an incoming call destination of an emergency call from the telephone terminal; a second video camera to be associated with the emergency call terminal; a second display unit to be associated with the telephone terminal; and a main apparatus which accommodates the telephone terminal and the emergency call terminal via a common extension network, wherein the main apparatus comprises: a determination processing unit which determines whether or not a call generated from the telephone terminal is an emergency call; a visual link forming unit which forms an image communication link between the first video camera and the second display unit to display an image captured by the first video camera on the second display unit when the determination processing unit determines that the call is the emergency call; and a voice link forming unit which forms a voice communication link between the telephone terminal and the emergency call terminal when the emergency call terminal performs a response operation for the call after the image communication link is formed.

According to an embodiment, FIG. 1 shows a system view depicting an example of an embodiment of a visual communication system regarding the present invention. This system is mainly formed by a main apparatus 10 as the core. The main apparatus 10 is installed in a hospital etc., and forms an extension telephone network connecting between a nurse station 2 and a hospital room 1. The hospital room 1 is provided with a user terminal 20 that is a telephone terminal and a personal computer (PC) 30. The PC 30 is associated with the user terminal 20 in advance, and functions by an operation together with the user terminal 20. A video camera 40 for capturing an image in the hospital room 1 (especially, an image of an inpatient) is connected to the PC 30.

The nurse station 2 is equipped with an emergency call terminal 21 and a PC 31. The PC 31 is associated with the emergency call terminal 21 in advance, and functions by working together with the emergency call terminal 21. A video camera 41 for capturing an image of a manager of the emergency call terminal 21 is connected to the PC 31. The PCs 30, 31 each include displays, and the displays are used as display units for displaying the images captured by the video cameras 40, 41, respectively.

The PCs 30, 31 are connected to a local area network (LAN) switch (LAN SW) 50, and connected to the main apparatus 10 via a private LAN. A server 60 for buffering image data is also connected to the LAN SW 50. A function to operate together the user terminal 20 with the PC 30 and the emergency call terminal 21 with the PC 30 has been already known, the function is actualized, for example, by setting which uses a protocol such as a session initiation protocol (SIP). According to this function, for example, by clicking a telephone number to be displayed on the display of the PC 31, a click to dial function to make a call to a desired partner's destination from the user terminal 20 may be actualized.

The main apparatus 10 includes a terminal interface unit 13, a LAN interface unit 15, a line interface unit 12, a switch unit 11 and a control unit 14. The terminal interface unit 13 is connected to the user terminal 20 and the emergency call terminal 21 via an extension telephone network. Thereby, the main apparatus 10 is connected to the user terminal 20 and the emergency call terminal 21. The LAN interface unit 15 is connected to the LAN switch 50 and processes the conversion between a packet flowing through the LAN and a PCM signal processed in the main apparatus 10.

The line interface unit 12 is coupled with a line exchange network 70 that is an external line network. Thereby, mutual communication between the extension telephone network and the external line is enabled. Especially, a disaster prevention center 100 that is a management center is connected to the exchange network 70. The disaster prevention center 100 is provided with an emergency response device 80. It makes possible to set a call among the user terminal 20, the emergency call terminal 21 and the emergency response device 80 via the main apparatus 10 from the line exchange network 70. The switch unit 11 conducts processing for converting the PCM signals among the line interface unit 12, the terminal interface unit 13 and the LAN interface unit 15, and for switching a communication link.

The control unit 14 includes a determination processing unit 14*a*, an image link forming unit 14*b* and a voice link forming unit 14*c* as a processing function regarding the embodiment.

The determination processing unit 14*a* determines whether or not the call generated from the user terminal 20 is an emergency call. If the generated call is a call made by dialing an emergency call number (special number), for example, the Japanese emergency fire station telephone number 119, the U.S.A. emergency telephone number 911, etc., the determination processing unit 14*a* determines that the call is the emergency call. More specifically, in this embodiment, if a state in which any operation is not performed after off-hook has continued for a specified time (e.g. one minute), the determination processing unit 14*a* determines that this state is a state of the emergency call.

When the determination processing unit 14*a* determines that the call from the user terminal 20 is the emergency call, the image link forming unit 14*b* forms an image communication link between the video camera 40 and the PC 31. Thereby, the PC 31 displays the image in the hospital room 1, especially the image of the user (inpatient) of the user terminal 20 in real time before the response from the manager.

It is convenient for designing the visual communication system that a server device 60 mainly performs the processing for forming the image communication link. That is, after issuing the command for forming the link to the server device 60 from the main apparatus 10, the server device then may take over the processing to perform the processing for forming the link. The SIP is usable for the protocol at that time. The same may apply to the below mentioned voice communication link.

After the PC 31 displays the image from the video camera 40, when the emergency call terminal 21 performs the response operation, the voice link forming unit 14*c* forms a voice communication link between the user terminal 20 and the emergency call terminal 21. Thereby, communication by voice is started between the user terminal 20 and the emergency call terminal 21.

More specifically, in the case of emergency call operation by the use of the special dial, the voce link forming unit 14*c* also forms a voice communication link between the user terminal 20 and the emergency response device 80. Thereby, the user of the user terminal 20 may make a contact with the disaster prevention center 100 in addition with the manager at the nurse station 2.

FIG. 2 is a flowchart depicting a processing procedure in the system of FIG. 1. In FIG. 2, when the user of the user terminal 20 performs the dial operation (Block S1), the main apparatus 10 conducts dial analysis processing (Block S2). If the dial operation makes a normal call, that is, the input dial number is not the emergency special number (119, 911, etc.), normal call processing is performed (Block S3).

If it is determined that the special number has been dialed in Block S2, the call is transferred to the emergency call terminal 21, processing to call the manager is performed by generating a ringing tone etc. (Block S4). Regardless of the presence or absence of the response from the manager, the image captured by the video camera 40 is immediately displayed on the PC 31 (Block S6). Thereby, the manager may confirm the state of a call origin user with eyes. When this state is established, the main apparatus 10 calls the emergency response device 80 though other channel, and performs processing for calling the operator of the center 100 in a similar manner (Block S7).

From this state, when the manager performs the response operation through the emergency call terminal 21 (Block S8), a communication channel by voice is established between the user terminal 20 and the emergency call terminal 21, a telephone call between the user in the hospital room 1 and the manager at the nurse station 2 is started. An interactive image communication link is formed at the same time; the image captured by the video camera 41 is displayed on the PC 30 (Block S9). Thereby, the user and the manager may start the visual communication of audio with video. Further, when the emergency response device 80 at the center 100 conducts the similar operation, another telephone call channel is also formed between the user terminal 20 and the emergency response device 80. In this state, the manager at the nurse station 2 may monitor the telephone call between the user and the operator of the center 100.

In contrast, it is determined that the user terminal 20 has performed only off-hook operation and has not performed any dial operation afterward for the specified time period. The emergency call terminal 21 is immediately called and the processing for calling the manager is conducted (Block S5). The PC 31 displays the image captured by the video camera 40 at the same time (Block S10). When the manager responds (Block S11), the communication channel by voice is established and the telephone call between the user and the manager is started. The interactive image communication link is formed and the image captured by the video camera 41 is displayed on the PC 30 (Block S12).

As mentioned above, in this embodiment, the determination processing unit 14*a* determines the operation content at the user terminal 20. If the operation content is an emergency call by the special number dialing, the image link forming unit 14b immediately forms the image communication link connecting between the video camera 40 and the PC 31. Thereby, the manager at the nurse station 2 may immediately know the situation of the call origin user. When the manager responds through the emergency call terminal 21, the voice communication channel is formed between the user terminal 20 and the emergency call terminal 21 by means of the voice link forming unit 14c. Thus, the telephone call communication is also started. Further, the interactive image communication link is formed; ant then, the PC 30 and the PC 31 visually display the mutual aspects.

Like this, as far as the case in which the emergency call terminal 21 received the emergency call, the PC 31 to cooperate with the emergency call terminal 21 displays the image captured from the video camera 40 attached to the PC 30 to cooperate with the user terminal 20. Thereby, for a normal call, the image communication channel is not formed and it is prevented for communication resources to be wasted unnecessarily.

In the embodiment, the visual communication system treats the case in which there is no dial operation after the elapse of the specified time from the off-hook of the telephone terminal as an emergency situation and performs the processing similar to the processing given above. Thus, even when the user loses consciousness, and even when the system is in any case, the situation of the call originating user may be surely grasped.

Although the existing technique may know the situation of the call origin user through its voice, the manager cannot monitor the image just after the calling. In contrast, in this embodiment, the image of the user is displayed on the PC31 of the manager before the manager at the emergency call terminal 21 makes a response. Thereby, the manager may grasp the situation of the user by the image before making the response and may take appropriate measures. Accordingly, the present invention has a particular effect on an application which especially needs an urgent response. Thus, the invention may provide a visual communication configured to surely perform appropriate measures in an occurrence of emergency call and a main apparatus for the system.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A visual communication system comprising:
a telephone terminal;
a first video camera to be associated with the telephone terminal;
a first display unit to be associated with the telephone terminal;
an emergency call terminal that is an incoming call destination of an emergency call from the telephone terminal;
a second video camera to be associated with the emergency call terminal;
a second display unit to be associated with the telephone terminal; and
a main apparatus which accommodates the telephone terminal and the emergency call terminal via a common extension network, wherein
the main apparatus comprises:
a determination processing unit which determines whether or not a call generated from the telephone terminal is an emergency call;
a visual link forming unit which forms an image communication link between the first video camera and the second display unit to display an image captured by the first video camera on the second display unit when the determination processing unit determines that the call is the emergency call; and
a voice link forming unit which forms a voice communication link between the telephone terminal and the emergency call terminal when the emergency call terminal performs a response operation for the call after the image communication link is formed.

2. The system according to claim 1, wherein
the visual link forming unit forms an image communication link between the second video camera and the first display unit to display an image captured by the second video camera on the first display unit when the voice communication link is formed.

3. The system according to claim 1, wherein
the determination processing unit determines that the call is the emergency call if the call is made by dialing an emergency call number.

4. The system according to claim 1, wherein
the determining processing unit determines that the call is the emergency call if a specified time has elapsed without any dial input from off-hook of the telephone terminal.

5. The system according to claim 3, further comprising:
a management center to be connected to the main apparatus via an external network differing from the extension network, wherein
the voice link forming unit forms a voice communication link between the telephone terminal and the management center if the determining processing unit determines that the call is the emergency call.

6. The system according to claim 4, further comprising:
a management center to be connected to the main apparatus via an external network differing from the extension network, wherein
the voice link forming unit forms a voice communication link between the telephone terminal and the management center if the determining processing unit determines that the call is the emergency call.

7. A main apparatus which accommodates a telephone terminal and an emergency call terminal that is an incoming call destination of an emergency call from the telephone terminal via a common extension network, wherein
the telephone terminal is associated with the first video camera and a first display unit,
the emergency call terminal is associated with a second video camera and a second display unit, and the main apparatus further comprising:
a determination processing unit which determines whether or not a call generated from the telephone terminal is the emergency call;
a visual link forming unit which forms an image communication link between the first video camera and the second display unit to display an image captured by the first video camera on the second display unit if the determination unit determines that the call is the emergency call; and a voice link forming unit which forms a voice communication link between the telephone terminal and the emergency call terminal when the emergency call terminal performs a response operation to the call after the image communication link is formed.

8. The apparatus according to claim 7, wherein
the visual link forming unit forms an image communication link between the second video camera and the first display unit to display an image captured from the second video camera on the first display unit when the voice communication link is formed.

9. The apparatus according to claim 7, wherein
the determination processing unit determines that the call is the emergency call if the call is mage by dialing an emergency call number.

10. The apparatus according to claim 7, wherein
the determination processing unit determines that the call is the emergency call if a specified time has elapsed without any dial input from off-hook of the telephone terminal.

11. The apparatus according to either claim 9, being connected to a management center via an external network differing from the extension network, wherein
the voice link forming unit forms a voice communication link between the telephone terminal and the management center if the determination processing unit determines that the call is the emergency call.

12. The apparatus according to either claim 10, being connected to a management center via an external network differing from the extension network, wherein
the voice link forming unit forms a voice communication link between the telephone terminal and the management center if the determination processing unit determines that the call is the emergency call.

\* \* \* \* \*